United States Patent [19]

Bowles

[11] 4,096,861
[45] Jun. 27, 1978

[54] SOLAR HEAT COLLECTION

[76] Inventor: Vernon O. Bowles, Naples, Fla.

[21] Appl. No.: 676,156

[22] Filed: Apr. 12, 1976

[51] Int. Cl.² .............................................. F24J 3/02
[52] U.S. Cl. ................................................... 126/271
[58] Field of Search ................. 126/270, 271; 237/1 A

[56] References Cited

U.S. PATENT DOCUMENTS

| 2,584,573 | 2/1952  | Gay       | 237/1 A |
|-----------|---------|-----------|---------|
| 3,140,824 | 7/1964  | Moore     | 237/17  |
| 3,390,672 | 7/1968  | Snelling  | 126/271 |
| 3,859,980 | 1/1975  | Crawford  | 126/271 |
| 3,918,430 | 11/1975 | Stout et al. | 237/1 A |
| 3,934,323 | 1/1976  | Ford et al. | 126/271 |
| 3,939,819 | 2/1976  | Minardi   | 126/271 |
| 3,974,822 | 8/1976  | Patil     | 126/271 |
| 3,977,601 | 8/1976  | Bearzl    | 237/1 A |
| 3,980,071 | 9/1976  | Barber    | 237/1 A |
| 3,981,294 | 9/1976  | Deminet   | 126/271 |

FOREIGN PATENT DOCUMENTS 2,442,529  3/1976  Germany ........................ 126/270

OTHER PUBLICATIONS

Solar Research – Components for Solar Energy Systems, Second catalog, 1975, 525 N. Fifth St., Brighton, Michigan.

NASA Tech Brief–Marshall Space Flight Center Self--Regenerating Desiccant System, B74, 10266, Jan. 1975.

Primary Examiner—Carroll B. Dority, Jr.
Attorney, Agent, or Firm—Albert C. Johnston; Gerard F. Dunne

[57] ABSTRACT

The heat of solar radiation is collected through a thin receptor panel directly into a layer of liquid held against and flowable only upwardly along the panel in shallow channels extending between upper and lower plenum spaces in a receptor chamber which is inclined across the path of the sunlight and connected in a flow circuit completely filled with the liquid under low pressure. The liquid in the receptor will accumulate heat in the upper plenum space to exceed a selected minimum temperature and can then be passed through the flow circuit, which extends from the upper plenum space via a heat exchange zone and then back into the lower plenum space. The total volume of liquid filling the system can be so small in relation to the exposed receptor surface area that little sun time is lost in bringing the system to a relatively high temperature for delivery of the collected heat. Further, the receptor is isolated from the ambient air and moisture in a manner enabling it to receive and collect the available solar heat efficiently at all times.

19 Claims, 12 Drawing Figures

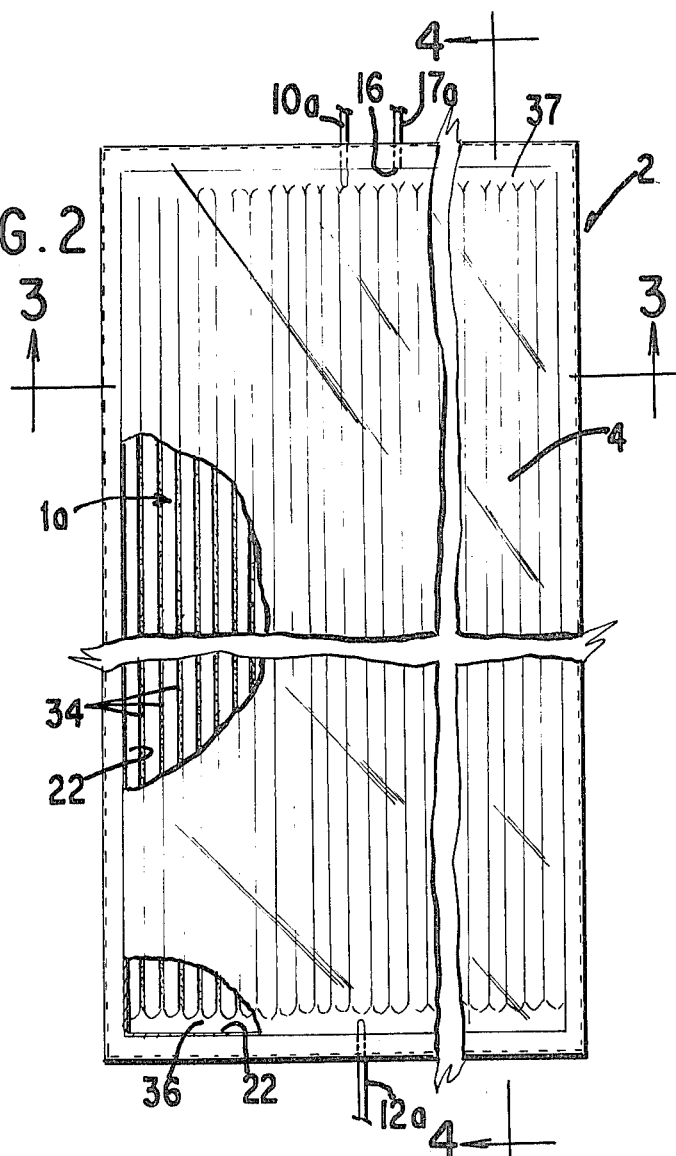
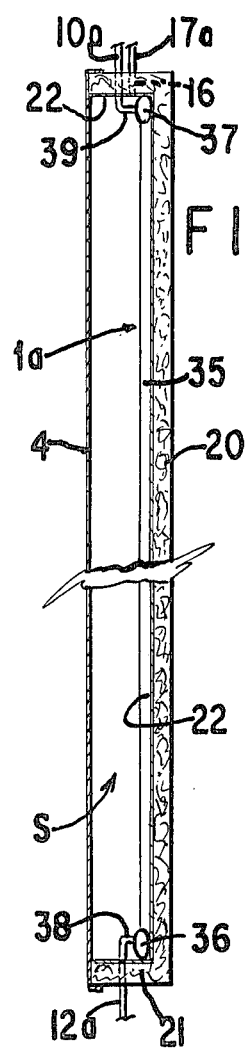
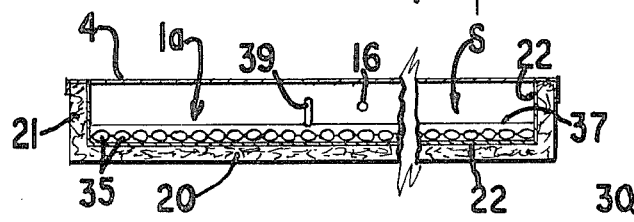
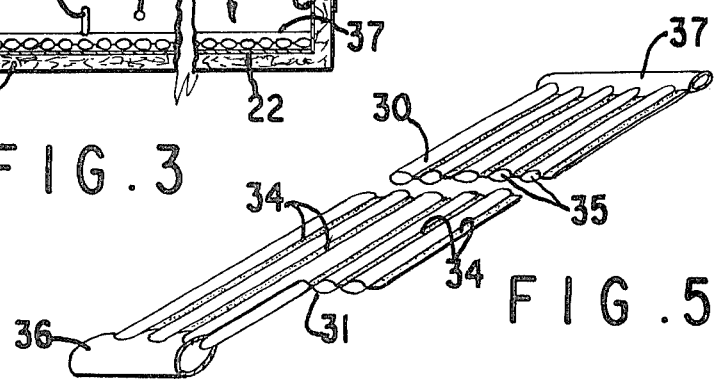

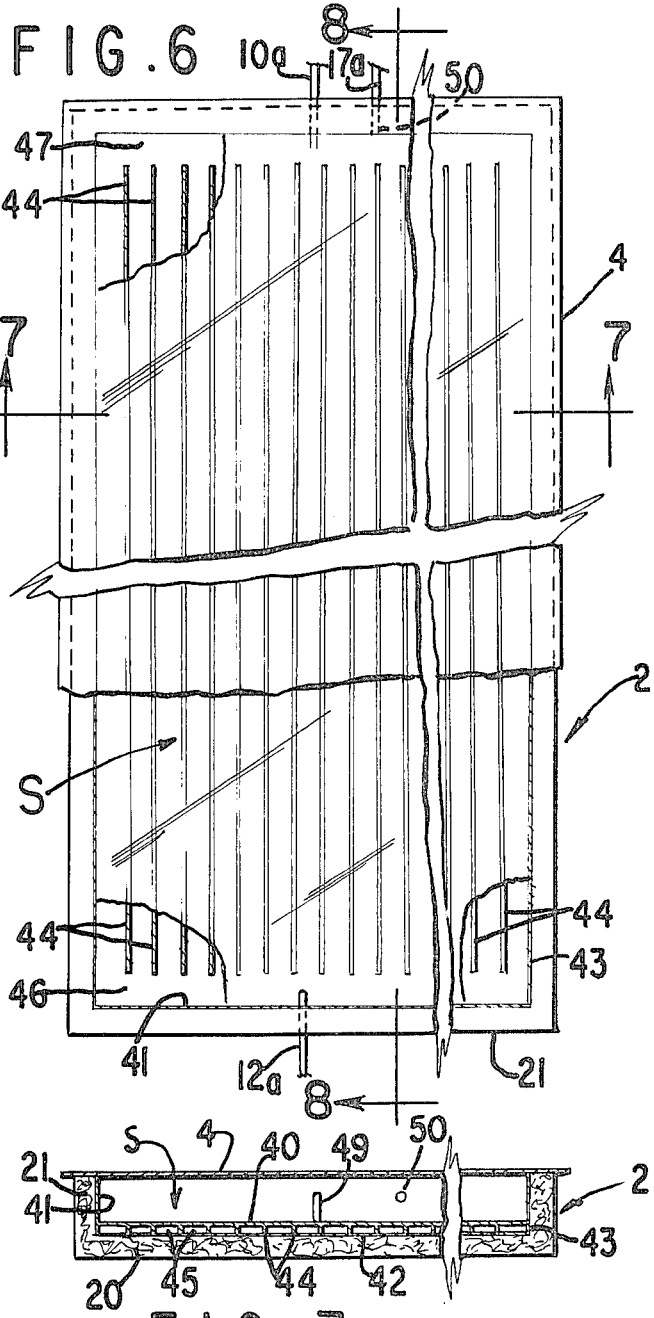
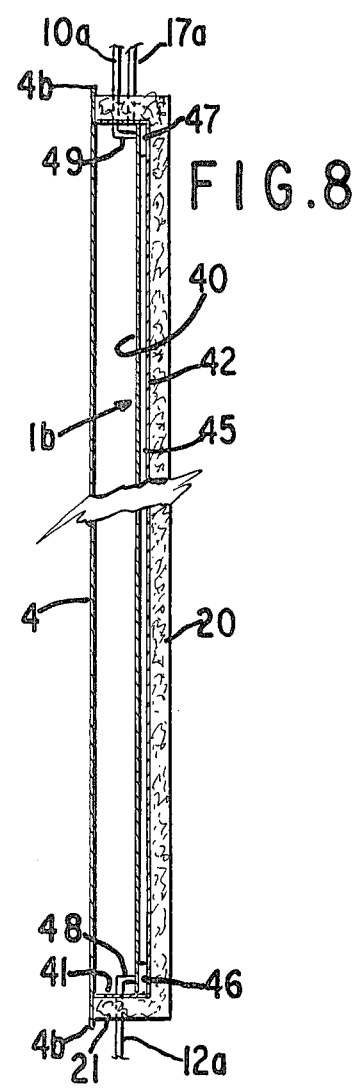
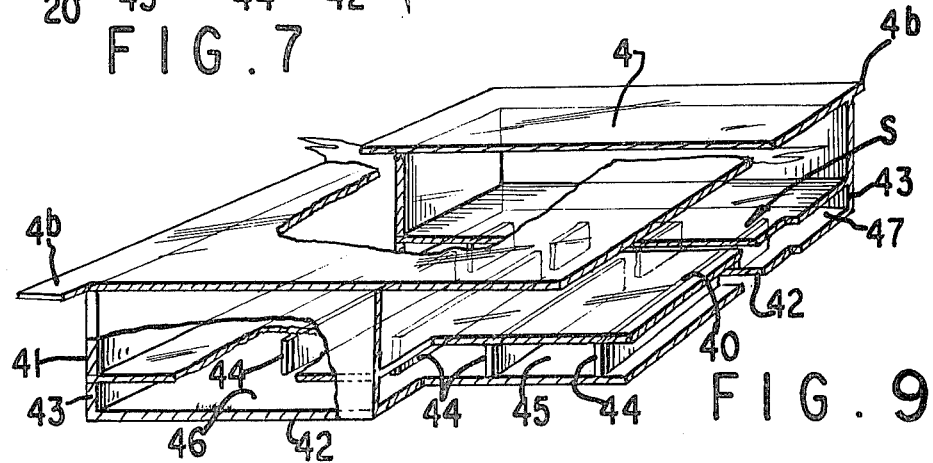

SOLAR HEAT COLLECTION

This invention relates to means for collecting heat from sunlight and, more particularly, to an apparatus of relatively simple and economical construction and operation by which the heat of solar radiation is collected in liquid at a high thermal efficiency and in a manner enabling a relatively high heat delivery temperature.

Many and various forms and kinds of apparatus and processes have been proposed for collecting solar heat in order to render it usable either directly or as a supplement to fuel energy for water heating or space heating needs. Many of the known proposals would provide radiation-receptive panels inclined across the path of the sunlight, together with means for collecting heat absorbed by the panels, or radiation passed through them, in a liquid carrying the heat away for utilization. Among the proposals generally of this description are those set forth in U.S. Pat. Nos. 2,469,496, 2,575,478, 2,594,232, 3,107,052, 3,194,228, 3,215,134, 3,236,294, 3,270,739, 3,513,828 and 3,918,430.

Those known proposals are not known to have attained any very extensive practical use or commercial success. Generally speaking, they involve important deficiencies in regard to the complexity and costs of construction and installation of the apparatus or the efficiency of the solar heat collection or the temperature level maintainable for delivery of the collected heat.

The principal object of the present invention is to provide an apparatus for collecting solar heat which will overcome or at least significantly alleviate those deficiencies, enabling installations for the collection and utilization of solar energy to be made and used economically at an expense outweighed by the value of the heat they will deliver usably.

Another object of the invention is to provide an apparatus by which solar heat is collected in a liquid carrier at a high thermal efficiency, and by which the liquid can be promptly brought to and delivered at a relatively highly elevated temperature when desired for efficient utilization of the heat.

Another object is to provide an apparatus making use of a solar radiation receptor having a simple and inexpensive chamber structure that is kept completely filled with liquid, in a manner enabling efficient collection of the heat yet with the receptor structure constantly safeguarded against distortion or rupture by hydrostatic pressure.

A further object of the invention is to provide, in an apparatus for collecting solar heat, means whereby a transparent cover sheet forming part of a substantially gas-tight closure shielding the solar radiation receptor from ambient atmospheric conditions is protected effectively against being either damaged by pressure variations or fogged by moisture condensation in the course of diurnal or cloudinduced temperature changes.

The apparatus of the present invention comprises as its basic element a substantially planar shallow liquid containing radiation receptor that is adapted to be placed in a heat insulating support at an inclination across the path of sunlight and kept completely filled with liquid for directly collecting the incident solar heat, yet is suited for a relatively inexpensive, modular manner of construction. This receptor comprises a thin front panel exposed to the radiation, a back panel and means interconnecting the two panels peripherally and in and along laterally spaced longitudinal regions thereof so as to define between them a shallow fluid-tight chamber subdivided into a multiplicity of long shallow channels which confine the liquid filling them to a thin layer and extend from a common plenum space in lower end of the channels to a common plenum space in its upper end. The lower plenum space is provided with an inlet for liquid flow thereinto, and the upper plenum space with an outlet for outflow of heated liquid. These flow passages are coupled with conduit means for conducting liquid in a circuit from the outlet to a heat exchange zone and thence back into the inlet, which circuit as well as the receptor chamber is kept completely filled with liquid, and means are provided for holding the liquid filling the circuit constantly under only an elevated pressure that will not distort or rupture the receptor chamber.

An installation of the apparatus may comprise as the radiation receptor a single receptor unit or a plurality of similar units, depending upon the exposed surface area of each unit and the amount of heat required from the installation. Plural receptor units may be made readily to a modular form suitable for easy installation. Each receptor unit, or module, may be made, for instance, with a width of about 2 to 4 feet and a length of about 6 to 8 feet, thus providing about 15 to 30 square feet of receptive front panel surface exposed to the sunlight. When there are two or more receptor units in an installation, as typically will be the case for space heating, their respective liquid inlets and liquid outlets are connected in parallel with the conduit means of the liquid flow circuit.

The front panel of the receptor advantageously is a clear thin wall composed of a strong plastic pervious to solar heat radiation, the liquid held beneath it then being a black or opaque liquid absorptive to the radiation and containing an antifreeze if needed. Such a liquid may be provided, for example, as an aqueous solution or suspension of the absorptive substance, which may be, for example, a fine carbon black or lampblack or a colloidal substance such as mercury sulfide, ferric hydroxide or colloidal gold. Alternatively, the front panel or both of the receptor panels may be opaque or black, as by being composed of a pigmented or coated strong plastic material or of metal, so that the heat radiation of the sunlight will be absorbed in the panel structure of the receptor and transferred directly from it to the liquid layer held constantly in contact with it. In the latter case, the liquid filling the flow circuit may be an aqueous antifreeze solution, or water if the climate permits, or any other suitably heatable and flowable liquid that will not deteriorate objectionably or cause objectionable sedimentation in the system.

The receptor may be constituted by suitably interconnected sheets of a strong flexible plastic sheet material, such, for example, as a polyvinyl chloride sheeting about 0.004 to 0.04 inch thick or an equivalent sheeting of polypropylene or polyethylene. Such sheets can be disposed one over the other and sealed together peripherally and along laterally spaced longitudinal regions thereof, as by heat sealed seams or by a suitable adhesive, so as to define between them a shallow fluid-tight chamber subdivided into the specified channels and plenum spaces. When the seams are continuous, the channels are laterally separate from each other. Thus, the receptor can be made somewhat in the manner of an air mattress, resulting in a non-rigid or pliable liquid confining chamber structure that will readily withstand the limited hydrostatic pressure to which it is subjected and the thermal stresses produced by atmospheric and solar temperature changes.

In an alternative embodiment, the radiation receptor is a relatively rigid chamber structure having substantially rigid thin front and back panels or walls joined together peripherally and along laterally spaced longitudinal regions thereof by spacing strips so as to provide the shallow channels and the plenum spaces. These walls and spacing strips may be formed of relatively rigid plastic sheet material, such, for example, as a clear or an opaque polystyrene or acrylic resin sheeting about 0.08 inch thick, or of sheet metal. Preferably, however, they will be formed as extrusions of the desired plastic material, or of metal, so that structural pieces of the receptor will need be joined and sealed together only along its upper and lower ends to form the plenum spaces.

The longitudinal seams, spacing strips or other structures subdividing the receptor chamber constrain its front and back panels against bulging too far apart or rupturing under the limited pressure of the liquid filling the chamber and confine the liquid in the chamber channels to a shallow layer which at all events is of less than one inch and preferably does not exceed about one-half inch in average depth. They limit the width of the channels so that liquid being heated in the channels will not distort them and will flow upwardly in them by thermal gravity effects. The may also keep each channel separate from the others so that the liquid heated in one channel will not diffuse laterally into other channels.

The receptor chamber thus is not merely provided with the required structural integrity; it also keeps a relatively small volume of liquid filling it distributed over relatively a very large radiation receptive area so that the liquid in each channel can be heated efficiently by the solar heat which it receives directly through or from the front panel contacting it, and the upflow of the liquid heated in the channels can result in the collection of hotter liquid in the upper plenum space, with the development of a substantially uniform elevated temperature there at a level which is controllable simply by regulation of the rate of heat removal or liquid flow.

The temperature of the solar heated liquid flowing into the upper plenum space can rise up to a limit principally determined by the solar heat intake and the heat losses of the receptor. The temperature at which the heated liquid will be delivered from the receptor depends upon those heat factors, the rate of liquid flow through the system and the temperature of the liquid being returned into the lower plenum space, this temperature being dependent upon the amount of heat taken out of the liquid as it passes through the conduit means and the heat exchange zone of the flow circuit.

For uses of the invention to collect and deliver solar heat at a relatively low temperature level, a relatively high volume of heat collecting liquid can be employed in the circuit, as by circulating liquid under low pressure through the receptor from and back into a pool or other relatively cool reservoir, or from and back through a heat exchanger in the flow circuit. It is also feasible to arrange the apparatus for thermal-gravity circulation of the heat collecting liquid, in which case a heat exchanger in the flow circuit and a leg of the conduit means extending to the heat exchanger from the receptor are located at an elevation sufficiently above the liquid outlet of the receptor to induce the required circulation of liquid.

In order to utilize the collected solar heat efficiently at a relatively high temperature, which is important for domestic water or space heating needs, the flow circuit of the apparatus includes a heat exchanger in which heat from the liquid outflow of the receptor is transferred to another fluid, and the entire receptor system is made with a limited liquid containing capacity, for instance to contain in total less than 2½ quarts and preferably less than 1¼ quarts of liquid per square foot of receptor surface exposed to the sunlight, so that relatively little sunlight time is required for bringing the system up to the temperature desired for the heat transfer to the other fluid, e.g., into the range of about 130° to 150° F.

For uses of this nature, the apparatus generally includes a pump for circulating the heat collecting liquid in the circuit through the heat exchanger, means for sensing the temperature of the liquid in the upper plenum space of the receptor, and means activated by this sensor for operating the pump when that temperature exceeds a predetermined level. Thus, a minimum temperature level is preset for delivery of the collected solar heat from the receptor. Further, in order to assure that the entire circuit will be at the desired elevated temperature when the collected heat is being transferred to the other fluid, a second temperature sensor is provided in the flow circuit of the receptor and connected with means whereby a pump or a valve for flowing the other fluid through the heat exchanger will be operated when the temperature of the liquid being circulated through the receptor circuit exceeds a second predetermined level higher than the minimum level above mentioned. The second level is to be kept about 5° to 20° F. higher than said minimum level. A combination of this kind is particularly useful where the other fluid is a second liquid that is to be heated to a considerably elevated temperature for storage in and use from a tank-whether as domestic hot water or as a medium for further heat transfer through a space heater.

According to a further feature of the invention, the radiation receptor is shielded from ambient atmospheric conditions by a substantially gas-tight closure comprising a transparent cover sheet spaced from the front panel of the receptor. The space beneath the cover sheet ordinarily contains air but it may also, or instead, contain other radiation permeable gas. For instance, a gas composed principally of helium may be used to some advantage. This cover space is connected with a means for flowing gas from and back into it in response to temperature-induced variations of the gas volume and pressure therein, which means may be a gas containing surge chamber, for instance, a gas impervious expansible and self-contractible container such as a partially inflated collapsible balloon, which holds some of the air or other gas in communication with the cover space through a tube connected with a vent in the closure over the receptor.

The temperature-induced flow of air or other gas from and back into the cover space can also be utilized with means for removing moisture from this flow so as to rid the atmosphere in the cover space of moisture originally present or ultimately diffusing into it, and thus to prevent fogging of the cover sheet by moisture condensation. In a simple arrangement for this purpose, the gas flow between the surge chamber and the cover space is conducted through a container holding a dessicant in contact with the gas passed therethrough.

Upon the basis of data obtained by experimental uses of apparatus embodying the present invention, it appears that, during sunny hours of a clear day, full scale installations of the apparatus will achieve efficiencies of solar heat recovery in the range of 50 to 80%, corresponding to about 220 to 320 BTU per hour per square foot of receptor surface exposed to the sunlight, while delivering the heat at a temperature level above 125° F. in the collecting liquid entering a heat exchanger in the receptor flow circuit.

The above mentioned objects, features and advantages of the invention will be further apparent, and others will also be evident, from the following detailed description and the accompanying drawings of illustrative embodiments of the invention. In the drawings:

FIG. 2 is a plan view of a receptor module comprising a solar radiation receptor, or heat collector, in an enclosure;

FIG. 3 is a transverse cross-sectional view taken along line 3—3 of FIG. 2;

FIG. 4 is a longitudinal cross-sectional view taken along line 4—4 of FIG. 2;

FIG. 5 is an enlarged perspective view, partly in section, of a portion of the receptor structure of FIGS. 2-4;

FIG. 6 is a plan view of a modified embodiment of the radiation receptor and a shielding closure;

FIG. 7 is a transverse cross-section view taken along line 7—7 of FIG. 6;

FIG. 8 is a longitudinal cross-sectional view taken along line 8—8 of FIG. 6;

FIG. 9 is an enlarged perspective view, partly in section, of a portion of the receptor and closure structures of FIGS. 6-8;

Figure 1:
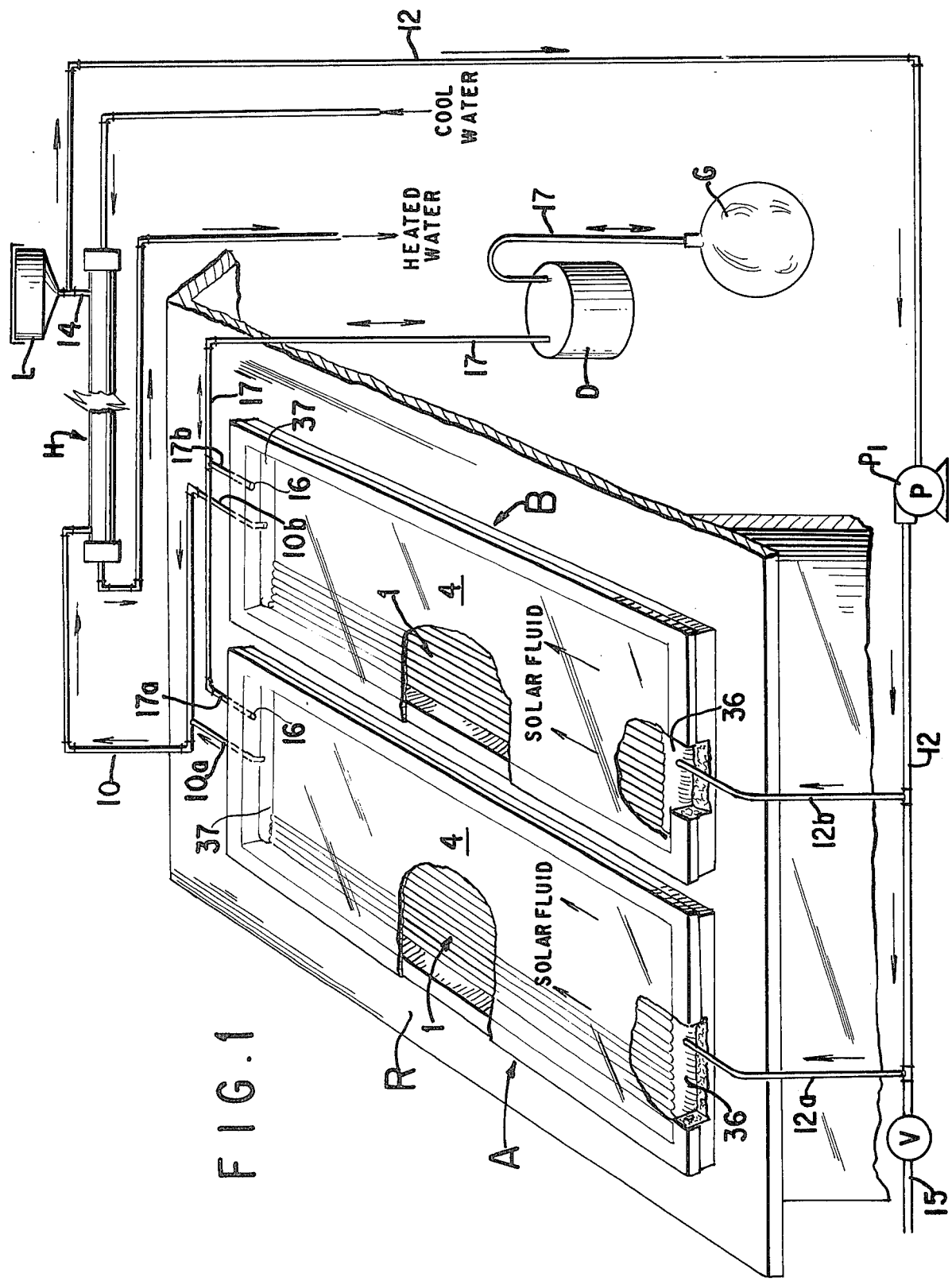
FIG. 1 is a schematic view of a solar heating installation embodying the invention.

The installation shown schematically in FIG. 1 comprises two similar solar receptor modules A and B which are located on a sloping roof R having a generally southern exposure so that the front surface of the radiation receptor, or heat collector, of each module lies across the path of the sunlight. More than two of the modules, or one only, may of course be provided. Each module corresponds generally to the structure shown in FIG. 2 or FIG. 5 and comprises a solar radiation receptor 1 which is shielded from ambient atmospheric conditions by being placed in a heat insulating tray-like support 2 and being closed off so as to exclude moisture and ambient air currents by means including a transparent cover sheet 4 spaced over the receptor.

The receptors 1 are connected in parallel in a liquid flow circuit arranged beneath the roof. The flow circuit includes a conduit 10 having branches 10a and 10b passed through the roof for conducting heated liquid from the upper ends of the receptors 1 into a heat exchanger H and a conduit 12 for conducting the heat collecting liquid from the heat exchanger back into the lower ends of the receptors through roof branches 12a and 12b. A low pressure circulating pump P1 is connected in conduit 12 for flowing the liquid in the circuit upwardly through the receptors and thence through the flow circuit.

A pressure limiting expansion chamber L (FIG. 1) holds a quantity of liquid at an elevation only a short distance, e.g., about 1 to 3 feet, above the highest point in the receptor liquid flow circuit, and in communication through a standpipe 14 with the liquid filling the circuit. The liquid level in chamber L keeps the liquid in the receptors 1 under a limited hydrostatic head, producing a little-elevated pressure which is insufficient to rupture the receptor chamber. This pressure at the lowest location in the receptor will usually amount to less than 5 pounds per square inch of receptor surface. The chamber L, being vented to the atmosphere, also accommodates the necessary expansion and contraction of the liquid filling the system and enables vapors to escape from the system.

It will be understood that other arrangements of the pressure limiting chamber may be used; for instance, a surge chamber may be provided at a lower elevation for holding a quantity of liquid in communication with the liquid filling the flow circuit so as to keep it under a limited elevated pressure maintained mechanically.

The initial filling of the system with the heat collecting liquid may be effected through the elevated surge chamber L. The filling may also be effected by flowing the liquid under low pressure into the system through a valved connection 15 leading into the lowest part of the conduit 12. In this way, the air and vapors in the system may be forced out readily through the chamber L as the liquid filling level rises through the system.

FIGS. 2-5 illustrate a receptor module containing an effective form of a radiation receptor according to the invention. This module comprises a tray-like rectangular heat insulating support 2 made with dimensions, preferably, of about 3 to 4 feet in width and 6 to 8 feet in length, thus enabling the enclosed receptor 1a, which is slightly smaller in area, to present about 15 to 30 square feet of front panel surface exposed to the sunlight. The receptor 1a is laid flat into the heat insulating support 2. The support is formed of an insulating foamed plastic composition, e.g., polystyrene foam, and comprises a base or back wall 20 and an upstanding side wall 21 enclosing the peripheral edge of the receptor. The inner surface of these walls preferably is covered by a heat-reflective foil layer 22, such as aluminum foil, to aid in limiting heat losses by radiation from the receptor.

A transparent cover sheet 4 in this embodiment is supported on and adhered in substantially gas-tight relation to the front of the side wall 21, thus closing off the receptor from ambient moisture and air currents and forming a substantially gas-tight cover space S of about 1 to 2 inches in depth between the cover sheet and the front of the receptor. The cover sheet 4 may be a sheet of window glass or plate glass. Preferably, however, it is a relatively stiff sheet of a strong clear plastic sheet material, such as a clear sheet of polystyrene or an acrylic resin (e.g., "Plexiglas").

The receptor 1a comprises a front panel 30 and a back panel 31, each formed by a thin sheet of a strong flexible plastic sheet material, such, for example, as clear polyvinyl chloride sheeting about 0.016 inch thick. The panels are joined together about their peripheral edges, as by a heat sealed seam or a strong adhesive, thus forming them into a liquid-tight chamber. The panels are also joined together, similarly, by a multiplicity of seams 34 which extend longitudinally thereof and are spaced apart laterally so as to confine the receptor chamber to a shallow substantially planar form subdivided into a multiplicity of laterally separate long shallow channels 35 extending from a common plenum space 36 across their lower ends to a common plenum space 37 across their upper ends.

The channels 35 in this embodiment are each limited in width, desirably being made about 1 inch or less wide between the bounding seams, so that in the use of the receptor, its chamber then being completely filled with liquid under a limited pressure, the liquid layer in each channel even under heating conditions will continue to have a substantially constantly limited depth, which preferably averages to not more than about one-fourth to one-half inch. In short, the panel interconnecting structures which subdivide the chamber confine the liquid layer filling the chamber so that as the liquid in the channels is being heated it will not distort the chamber, and will flow upwardly in them by thermal-gravity effects. The chamber structure thus induces an upwardly increasing temperature gradient in each channel, causing the hottest liquid in the receptor to collect in the upper plenum space 37 for delivery from it through the liquid flow circuit for exchange of the collected solar heat.

An inlet 38 opening into the lower plenum space 36 is provided for the flow of heat collecting liquid from conduit branch 12a (or 12b) into the receptor chamber, and an outlet 39 opens from the top of the upper plenum space 37 for the outflow of heated liquid into conduit branch 10a (or 10b). Each of these flow connections may be formed, for example, by a piece of PVC tubing sealed into an opening in the front wall of the related plenum space. The tubing pieces or portions of the respective conduit branches connected with them are passed through the sealed in respective openings in the side wall 21 at the upper and lower ends of the heat insulating receptor support 2, where branch connections join each receptor 1a into the flow circuit of the heat collecting liquid, for instance as indicated in FIG. 1.

In preferred practices of the invention, the front panel 30 of the receptor 1a is a clear or at least translucent wall pervious to solar heat radiation, and the liquid filling the receptor is an aqueous solution or suspension of a substance absorptive to the radiation, such, for example, as a black liquid formed by mixing a small proportion of lampblack paste and a suspending agent with water or an antifreeze solution. Although in principle somewhat less efficient, it is also effective to form the receptor with an opaque or black front panel 30 absorptive to the radiation, e.g., a panel of a plastic sheet material pigmented or painted dull black, and to use clear water or an antifreeze or antifreeze solution, or any other desired liquid, as the heat collecting liquid. This alternative is effective because of the constant direct contact and direct heat wiping action of the shallow layer of liquid held against the front panel which receives the radiation.

As indicated in FIGS. 1 and 2, a breathing port 16, or vent, is provided for the cover space S inside the closure of each receptor, e.g., the space between the front of the receptor and its transparent cover sheet 4. A tube from this port extends through the side wall 21 of the support 2 and is connected with a gas impervious surge chamber G through a roof branch 17a or 17b of a conduit 17. The surge chamber G may be, for instance, a partially filled collapsible balloon. It contains a quantity of the air or other gaseous atmosphere of the cover space and is expansible and self-contractible in response to variations of the volume and pressure of the air or other radiation permeable gas in the cover space. Consequently, that air or other gas, while being kept isolated from the moisture and currents of the ambient atmosphere, will flow out and back in periodically as the gas volume in the cover space is varied by diurnal and cloud-induced temperature changes, thus preventing objectionable deflections or stresses of the cover sheet by pressure changes and limiting their tendency to draw moist ambient air into the cover space.

The gas in the cover space ordinarily will contain moisture, either initially or, in time, as a result of diffusion or seepage of moisture thereinto. The temperature-induced flow of air or other gas back and forth between the cover space S and the surge chamber G can be utilized for removing any objectionable moisture by conducting this flow through a closed container D connected in conduit 17 as a part thereof and holding a dessicant in contact with the gas flow. In this way, the atmosphere in the cover space can be kept so low in moisture content that condensation or fogging on the underside of the cover sheet, which would seriously obstruct its transmission of solar heat radiation, will be prevented at all times.

FIGS. 6–9 illustrate an alternative form of construction of a radiation receptor according to the invention and of a closure for isolating it from ambient air. In this embodiment, the receptor 1b is a substantially rigid liquid-tight shallow chamber structure formed by a front panel or wall 40 and a back panel or wall 42 with peripheral spacing strips 43 interconnecting these panels about their edges and longitudinal spacing strips 44 interconnecting them along laterally spaced longitudinal regions of the chamber. The strips 43 and 44 hold the panels spaced apart by a distance of about one-half inch or less, for instance about 0.4 inch. The strips 44 subdivide the shallow chamber into a multiplicity of laterally separate shallow channels 45 extending from a common plenum space 46 across their lower ends to a common plenum space 47 across their upper ends. The substantial rigidity of this receptor structure enables the channels 45 to be made with a width of 1 to 2 inches or more, for instance of about 1½ inches, while still securely confining the liquid filling the receptor to a thin layer for collection of the solar heat in the manner described above.

An inlet 48 opens into the lower plenum space 46 for the flow of heat collecting liquid into the receptor chamber from conduit branch 12a (or 12b), and an outlet 49 opens from the top of the upper plenum space 47 for the outflow of heated liquid into the liquid flow circuit through conduit branch 10a (or 10b). These elements may be formed and connected in the flow circuit substantially as described in relation to FIGS. 1–5.

The panels 40 and 42 are composed, for instance, of a clear, substantially rigid polystyrene sheet material about 0.08 inch thick. The spacing strips 43 and 44 may be strips of similar material, joined to the panels by fusion or by an adhesive cement suited for polystyrene sheeting. Other strong plastic sheet material, for instance a clear acrylic resin sheeting, may be used instead of polystyrene sheeting. A light-weight, heat conductive sheet metal, e.g., aluminum, magnesium or copper sheeting, may also be used. For manufacture in quantity, a rigid receptor similar to receptor 1b would be obtained more economically and with greater structural unity, from either plastics or metal, by extruding the selected material into a long shallow hollow body having front and back walls interconnected by integral channel-forming partitions and joining trough-like end pieces forming the plenum spaces onto the ends of a suitable length of the extrusion.

As shown in FIGS. 6–9, the receptor 1b is supported in a heat insulating tray-like support 2 with its inlet and outlet conduit connections 12a and 10a extending through the insulating side wall 21, substantially as in the embodiment of FIG. 2. The closing off of the receptor 1b beneath the transparent cover sheet 4 for the exclusion of ambient air may also be effected as described in relation to FIGS. 2–5. On the other hand, it is also feasible to close the cover space over the receptor 1b in the manner shown in FIGS. 6–9.

The transparent cover sheet 4 in this instance is composed of a clear plastic sheet material, e.g., of clear polystyrene sheeting about 0.10 to 0.20 inch thick, and is spaced about 1½ inches above the front panel 40 of the rigid receptor 1b, being joined in sealed relation to its peripheral edge by an intervening peripheral side wall 41 of similar material. The cover sheet and the radiation receptor thus constitute an integral unit in which the receptor is effectively sealed off from ambient air. This unit can be set in place in the support 2 without need for sealing the cover sheet to the insulating side wall 21. Instead, the cover sheet has a marginal edge portion 4b extending beyond the closure side wall 41 to overlie wall 21.

The cover space S of the receptor 1b is connected through an opening and vent tube 50 in side wall 41 with a branch 17a (or 17b) of conduit 17. Accordingly, in the manner previously described, the air or other gaseous atmosphere over the receptor will flow back and forth between the cover space and the surge chamber G in response to temperature changes, and any objectionable moisture present in the gas flow will be removed by the dessicant in chamber D.

Figure 10:
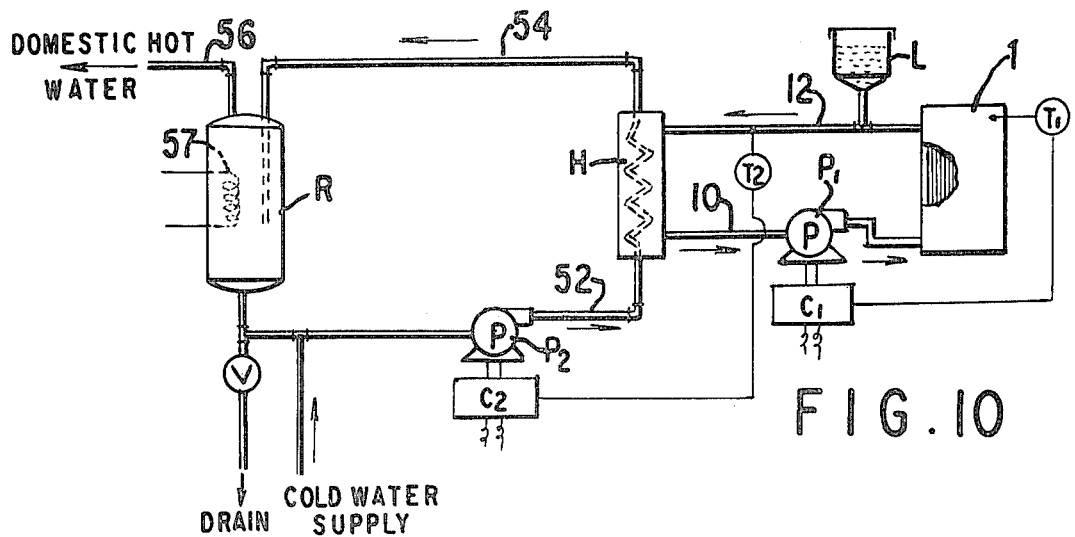
FIG. 10 is a schematic view of a relatively simple system for the delivery and utilization of solar heat according to the invention.

FIG. 10 shows schematically a relatively simple arrangement for delivering at a desirably elevated temperature the solar heat collected according to the invention. The radiation receptor 1, consisting of one or more units like receptor 1a or 1b, is connected substantially as described in relation to FIG. 1 in a liquid flow circuit constituted by inflow and outflow conduits 10 and 12 and a liquid-to-liquid heat exchanger H. The conduits 10 and 12 extend from and to the shell side passageway of the heat exchanger H. When the pump P1 in conduit 10 is operating, it circulates the heat collecting liquid upwardly through the receptor chamber(s), out from the upper plenum space(s), and thence back to the lower plenum space(s) via the heat exchanger—but without exceeding the pressure fixed by the hydrostatic head to the surge chamber L.

The heat exchanger H contains tubes inside its shell for heat transfer through their walls to a second fluid to be heated. This fluid in the arrangement of FIG. 10 is water under domestic line pressure, which is deliverable by a pump P2, or by a suitably controlled valve if desired, from either the domestic water line or the bottom of a hot water storage tank R via a piping leg 52 into and through the heat exchanger tubes and thence through a piping leg 54 into a middle region of the tank. The tank R has a hot water offtake pipe 56 at its top and usually would be equipped with a supplemental water heater, e.g., an electrical heating element 57, for use when needed.

A temperature sensor T1 is located in or beneath the upper plenum space of the receptor 1 and connected with a control means C1 in the current supply line to the pump P1. The sensor T1 is settable so that it will activate the control means C1 to bring pump P1 into operation when the temperature of the liquid in the upper plenum space exceeds a predetermined minimum level, for instance, 110° F. A second temperature sensor T2 is located in the receptor liquid flow circuit, say in conduit 12, and connected with a control means C2 in the current supply line to pump P2. Sensor T2 is settable to activate control means C2, thus bringing pump P2 into operation, when the temperature of liquid being circulated in the receptor flow circuit exceeds a second predetermined level higher than the minimum set by sensor T1. This second temperature level usually will be above 125° F. for producing domestic hot water.

In the operation of the installation, as the liquid filling the receptor 1 becomes heated by solar radiation received in or through the front panel of the receptor the heated liquid rises into the upper plenum space of the receptor, and when the temperature there reaches or exceeds the minimum set by sensor T1 the pump P1 is operated. The heated liquid then is circulated through the receptor flow circuit, bringing its conduits and the heat exchanger H nearly to the temperature level at the upper end of the receptor.

Due to the low ratio of liquid volume in the system to receptor surface area, which typically will amount to less than 1½ quarts and preferably less than 1¼ quarts of liquid per square foot of exposed receptor surface, the temperature of the circulating receptor liquid under continuing sunlight increases relatively fast. Generally it will rise into the range of 140° to 180° F. if heat is not being transferred out of the heat exchanger. The sensor T2, however, is set to act at a temperature level desired for the heat delivery in the heat exchanger H, for instance at 130° F. When the temperature of the liquid in the receptor flow circuit reaches or exceeds this level, the pump P2 is operated to flow domestic water through the tubes of the heat exchanger and thence into tank R at a rate suitable for heating the water nearly to the temperature level of the receptor liquid entering the heat exchanger.

Tests of experimental apparatus according to the invention have indicated that an installation comprising two receptor modules presenting, together, about 36 to 48 square feet of exposed receptor surface would on clear winter days deliver about 8000 to 12000 BTU of solar heat per hour to domestic water in the heat exchanger, while keeping the solar collecting liquid at a temperature above 125° F. at the heat exchanger inlet.

Figure 11:
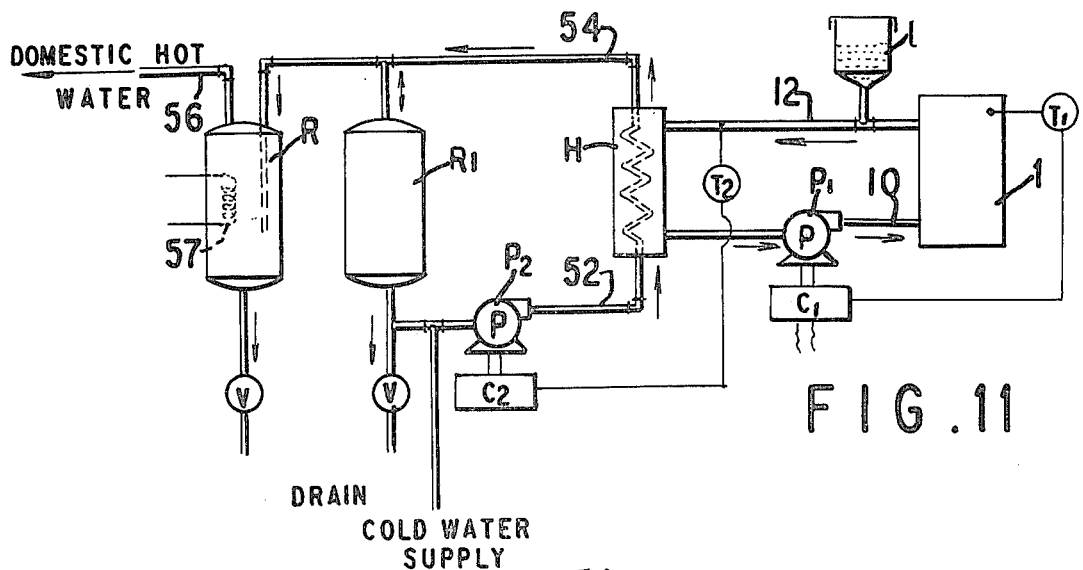
FIGS. 11 and 12 are schematic views of systems adapted for domestic water heating and space heating, respectively.

It is apparent that a system having a single tank for storing solar heated water as in FIG. 10 may not utilize the full heating capability of a solar heat collecting installation. FIG. 11 illustrates a better system in this regard, which is similar to the system of FIG. 10 excepting that a heat reservoir R1, which may be a hot water storage tank, is connected at bottom and top to the piping legs 52 and 54, respectively, and the tank R is not connected to the cold water piping leg 52. In this arrangement, when the pump P2 is operating by activation from sensor T2 it will flow water to be heated through the tubes of the heat exchanger H from either the bottom of tank R1 or the domestic water line, and the water heated in the heat exchanger passes from it through piping leg 54. This heated water will flow into tank R if domestic hot water is being drawn; otherwise, it flows into the top of tank R1, causing cooler water from the bottom of this tank to be pumped through the heat exchanger H to build up the heat storage in tank R1.

The pump P2 desirably is a positive displacement or rotary type pump which, when not operating, blocks cold water flow to the heat exchanger. Alternatively, a valve that opens only under the pressure of pump P2 may be provided in piping leg 52 to block cold water flow. Accordingly, when the pump P2 is not operating hot water drawn from tank R in FIG. 11 is replaced by hot water flowing into this tank from the top of the heat reservoir R.

Figure 12:
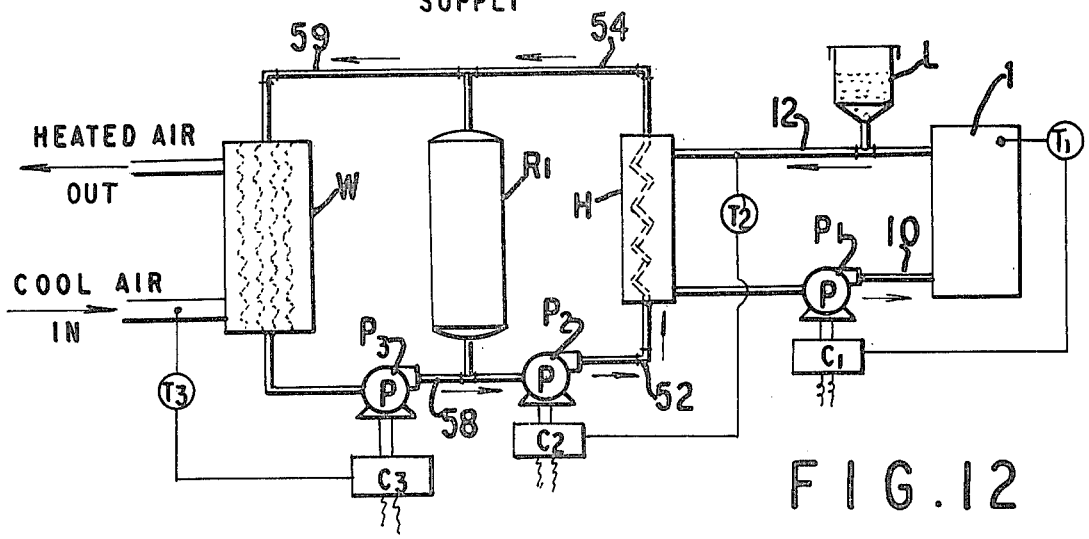

FIG. 12 illustrates an arrangement of apparatus according to the invention for space heating. For this purpose, the solar receptor 1 ordinarily will be constituted by the radiation receptors of several solar receptor modules, in order to provide a solar heating capacity exceeding the space heating requirements during sunny period, and a heat reservoir R1 of appropriate capacity is provided, as in the arrangement of FIG. 11, to store heated liquid for utilization in dark or cloudy periods.

The system of FIG. 12 is generally similar to that of FIG. 11 as to the correspondingly designated components, although the pump P2 in this case may be a low pressure pump. Instead of the tank R and the cold water supply line of FIG. 11, a liquid-to-air heat exchanger W is connected in a piping circuit having branches 58 and 59 connected, respectively, with the piping legs 52 and 54. The heat exchanger W is of the "air-fin" type, comprising tubes for conducting heated liquid through the exchanger with fins on the tubes for transferring heat to air flowing into contact with them from the space to be heated.

The piping branch 58 contains a pump P3 which is activated by control means C3 in its current supply circuit when the air temperature sensed by a sensor T3 in the space to be heated falls below a preset level. The pump P3 then circulates heated liquid, typically water, through the tubes of the heat exchanger W, either from the top of tank R1 or, if the pump P2 is operating, from the solar heat exchanger H via piping leg 54; and the liquid is returned either to the bottom of tank R1 or to the solar heat exchanger.

In the use of the system of FIG. 12, the pump P2 when operating will draw liquid from the bottom of the heat storage tank R1 and circulate it through the solar heat exchanger H at a rate, adapted to the rate of delivery of solar heat in the receptor flow circuit, which will bring the liquid to the temperature desired for the further heat transfer in exchanger W and/or for the storage of the delivered solar heat. The amount of heat transferred per unit of sunny time will generally be greater in the solar heat exchanger than in the air heater W, so that an excess of solar heat will be delivered for storage in tank R1 and use when needed during dark or cloudy periods. Although as a matter of economy the liquid used for the space heating and heat storage ordinarily would be water, it may as well be any other suitable liquid.

A single pump can be used to serve the functions of the two pumps P2 and P3, by providing in piping let 52 or 54 a valve to close their flow circuit when the temperature sensed by sensor 12 is below the preset level, and providing in piping branch 58 or 59 a valve to close their circuit when the temperature sensed by sensor T3 is above the preset level. Such valves will prevent cold water from being drawn from the bottom of tank R1 via the solar heat exchanger H to the liquid-to-air heat exchanger W, and prevent hot water from being drawn from the top of tank R1 via heat exchanger W to heat exchanger H.

It will be evident that the present invention provides a solar heating apparatus and system which are particularly advantageous in that:

(1) The heat of solar radiation is collected directly through a thin receptor panel into a shallow layer of liquid constantly held in direct contact with and flowable upwardly along the under side of this panel, which, being kept constantly under only a small pressure head, can readily be of 15 to 30 square feet, or larger, in radiation receptive surface area; so a solar heat collecting efficiency of 50 to 80% can be attained, giving about 4000 to 8000 BTU of deliverable heat per hour from each receptor under a clear high sun.

(2) As heat collects in the liquid layer of the receptor the heated liquid flows upwardly and will collect the heat in the upper end of the receptor; so any desired heat delivery temperature up nearly to a maximum receptor temperature in the range of about 140° to 180° F. can be selected and reached quickly for utilization of the collected heat.

(3) By virtue of the collection of hotter liquid at the upper end of the receptor, plural receptor units, or modules, can be connected in parallel for assured delivery of the heat collected in them through a common liquid flow circuit at a desired elevated temperature, and the heating capability of an installation can readily be made larger or smaller according to the number of receptor modules utilized.

(4) The receptor liquid flow circuit can be limited readily to a low liquid inventory, amounting for instance to less than 2½ quarts and preferably even less than 1¼ quarts per square foot of exposed surface, with corresponding limitation of the heat losses and time involved in bringing the entire flow system to an elevated temperature desired for delivery of the collected heat; so high heat delivery temperatures, for instance of above 125° F. as desired for domestic water heating, can be reached promptly throughout the system and utilized for heat transfer by a continuing flow of the receptor liquid. Since not more than about 30 to 60 minutes of clear sun time will be needed for readying the system, an exceptionally large proportion of the sunny periods of daytime is made usable for solar heating at a high temperature level.

(5) The radiation receptor, being subject to little hydrostatic pressure, can be fabricated from any of a variety of materials at low cost. Depending upon preferences and the availability of materials and equipment for its fabrication, the receptor can be made of clear plastic sheeting or extrusions, flexible or rigid, for use with an opaque or black liquid absorptive to solar radiation, or of opaque or black radiation absorptive plastic or metal sheeting or extrusions, flexible or rigid, for use with water or any other desired liquid as the heat collecting medium.

(6) The receptor liquid flow is adaptable for a variety of heat delivery systems, including even thermal-gravity circulation of the liquid if desired. It is particularly suitable for being controlled so as to assure a desired elevated temperature level for the delivery of solar heat under the changing conditions which accompany changes of the sun position, variable degrees of haziness or cloudiness, and the diurnal cycle.

(7) The receptor is isolated effectively from the moisture and currents of ambient air, under a transparent cover sheet which is kept free of both obstruction by moisture condensation and deflection by pressure change on its under side; so it will receive and collect the available solar heat efficiently at all times.

What is claimed is:

1. Apparatus for collecting solar heat comprising a substantially planar radiation receptor adapted to be supported at an inclination across the path of sunlight, said receptor being composed essentially of thin sheet material and comprising a thin front panel exposed to the solar radiation, a back panel and means interconnecting said panels peripherally and in and along laterally spaced longitudinal regions thereof so as to define between them a shallow fluid-tight chamber subdivided into a multiplicity of long shallow channels for confining liquid filling them to a thin layer and extending from a common plenum space in the lower end of the chamber to a common plenum space in its upper end, an inlet to said lower plenum space for liquid flow thereinto, an outlet from said upper plenum space for outflow of liquid, said channels each being of not more than ½ inch in average depth and being sufficiently limited in width so that liquid filling and being heated in said channels will not distort them and will flow only upwardly in them under the influence of thermal-specific gravity gradients to bring hotter liquid perferentially into said upper plenum space, conduit means for conducting liquid in a circuit from said outlet to a heat exchnage zone and thence back into said inlet, means for keeping said receptor and said conduit means completely filled with liquid and holding the liquid in said receptor constantly under a substantially uniform limited hydrostatic pressure insufficient to rupture said receptor, and means for continuously circulating the liquid in said circuit into and upwardly through and from said receptor under a constantly low pumping pressure sufficient to prevent substantial deviation from said hydrostatic pressure as said liquid is being circulated, said heat exchange zone comprising a heat exchanger having therein passageway connected in said circuit with said conduit means for conducting said liquid along one side of heat transfer walls adapted to be contacted over their other side by a fluid to be heated, said liquid circulating means including a pump in said conduit means, means for flowing said fluid through said heat exchanger in contact with said other side of said walls, means for sensing the temperature of liquid in said chamber, means activated by said sensing means for operating said pump when said temperature exceeds a first predetermined level, a second means for sensing the temperature of liquid being pumped through said circuit, and means activated by said second means for operating said means for flowing said fluid when the latter temperature exceeds a second predetermined level higher than said first level.

2. Apparatus for collecting solar heat comprising a substantially planar radiation receptor adapted to be supported at an inclination across the path of sunlight, said receptor being composed essentially of thin sheet material and comprising a thin front panel exposed to the solar radiation, a back panel and means interconnecting said panels peripherally and in and along laterally spaced longitudinal regions thereof so as to define between them a shallow fluid-tight chamber subdivided into a multiplicity of long shallow channels for confining liquid filling them to a thin layer and extending from a common plenum space in the lower end of the chamber to a common plenum space in its upper end, an inlet to said lower plenum space for liquid flow thereinto, an outlet from said upper plenum space for outflow of liquid, said channels each being of not more than ½ inch in average depth and being sufficiently limited in width so that liquid filling and being heated in said channels will not distort them and will flow only upwardly in them under the influence of thermal-specific gravity gradients to bring hotter liquid preferentially into said upper plenum space, conduit means for conducting liquid in a circuit from said outlet to a heat exchange zone and thence back into said inlet, means for keeping said receptor and said conduit means completely filled with liquid and holding the liquid in said receptor constantly under a substantially uniform limited hydrostatic pressure insufficient to rupture said receptor, and means for continuously circulating the liquid in said circuit into and upwardly through and from said receptor under a constantly low pumping pressure sufficient to prevent substantial deviation from said hydrostatic pressure as said liquid is being circulated, said heat exchange zone comprising a liquid-to-liquid heat exchanger having therein passageway connected in said circuit with said conduit means for conducting said liquid along one side of heat transfer walls adapted to be contacted over their other side by a second liquid to be heated, said liquid circulating means including a pump in said conduit means, a tank for storing said second liquid in heated state, means for flowing said second liquid through said heat exchanger in contact with said other side of said walls and thence into said tank, a first means for sensing the temperature of liquid in said upper plenum space, means activated by said first means for operating said pump when said temperature exceeds a first predetermined level, a second means for sensing the temperature of liquid being pumped through said circuit, and means activated by said second means for operating said means for flowing said second liquid when the latter temperature exceeds a second predetermined level higher than said first temperature level.

3. Apparatus according to claim 2, said second liquid being water under domestic line pressure from a water line or the bottom of said tank, said means for flowing said second liquid comprising a relatively high pressure pump.

4. Apparatus according to claim 2, adapted for space heating, said receptor including a plurality of receptor modules, each comprising a shallow liquid-filled chamber as aforesaid, having their respctive inlets and outlets for liquid flow connected in parallel with said conduit means, said apparatus further comprising a liquid-to-air heat exchanger having tubes for passage of said second liquid therethrough and fins on the tubes for transferring heat to air contacting them, said means for flowing said second liquid including piping having upper and lower legs thereof extending respectively from the bottom of said tank to said liquid-to-liquid heat exchanger and from the latter to the top of said tank, said exchanger tubes being in another piping circuit interconnecting said piping legs, and means for passing through said other piping circuit either liquid from and to said tank or liquid from and to said liquid-to-liquid heat exchanger when said means for flowing said second liquid is operating.

5. Apparatus for collecting solar heat comprising a substantially planar radiation receptor adapted to be supported at an inclination across the path of sunlight, said receptor being composed essentially of thin sheet material and comprising a thin front panel exposed to the solar radiation, a back panel and means interconnecting said panels peripherally and in and along laterally spaced longitudinal regions thereof so as to form them into and define between them a shallow fluid-tight chamber subdivided into a multiplicity of long shallow channels for confining liquid filling them to a thin layer and extending from a common plenum space in the lower end of the chamber to a common plenum space in its upper end, an inlet to said lower plenum space for liquid flow thereto, an outlet from said upper plenum space for outflow of liquid, said channels each being of not more than one-half inch in average depth and being sufficiently limited in width so that liquid filling and being heated in said channels will not distort them and will flow only upwardly in them under the influence of thermal-specific gravity gradients to bring hotter liquid preferentially into said upper plenum space, conduit means for conducting liquid in a circuit from said outlet to a heat exchange zone and thence back into said inlet, means for keeping said receptor and said conduit means completely filled with liquid and holding the liquid in said receptor constantly under a substantially uniform limited hydrostatic pressure insufficient to rupture said receptor, and means for continuously circulating the liquid in said circuit into and upwardly through and from said receptor under a constantly low pumping pressure sufficient to prevent substantial deviation from said hydrostatic pressure as said liquid is being circulated, said apparatus further comprising closure means including a transparent cover sheet spaced from said front panel and forming over said receptor a substantially gas-tight cover space containing air or other radiation permeable gas, and means communicating with said cover space for flowing gas into and from the same in response to variations of the pressure therein, said means for flowing gas comprising a surge chamber holding gas in communication with the gas in said cover space.

6. Apparatus according to claim 5, said closure means including a heat insulating support having a base underlying and an upright side wall extending peripherally about said receptor, said cover sheet overlying and being sealed to said side wall.

7. Apparatus according to claim 5, said support being composed of a rigid foamed plastic material having a heat reflective foil layer over its surface adjacent to said receptor.

8. Apparatus according to claim 5, said receptor being rigid and said closure means including a rigid peripheral side wall interconnecting said cover sheet and the periphery of said receptor.

9. Apparatus for collecting solar heat comprising a substantially planar radiation receptor adapted to be supported at an inclination across the path of sunlight, said receptor comprising a thin front panel exposed to the solar radiation, a back panel and means interconnecting said panels peripherally and in and along laterally spaced longitudinal regions thereof so as to define between them a shallow fluid-tight chamber subdivided into a multiplicity of long shallow channels for confining liquid filling them to a thin layer and extending from a common plenum space in the lower end of the chamber to a common plenum space in its upper end, an inlet to said lower plenum space for liquid flow thereto, an outlet from said upper plenum space for outflow of heated liquid, conduit means for conducting liquid completely filling said chamber and said conduit means in a circuit from said outlet to a heat exchange zone and thence back into said inlet, means for holding said liquid constantly under an elevated pressure insufficient to rupture said chamber, closure means including a transparent cover sheet spaced from said front panel and forming over said receptor a substantially gas-tight cover space containing air or other radiation permeable gas, and means communicating with said cover space for flowing gas into and from the same in response to variations of the pressure therein, said means for flowing gas comprising a surge chamber holding gas in communication with the gas in said cover space.

10. Apparatus according to claim 9, said surge chamber comprising a gas impervious expansible and self-contractible container.

11. Apparatus according to claim 5, said gas consisting principally of helium.

12. Apparatus according to claim 9, further comprising means for removing moisture from the gas flow to and from said cover space.

13. Apparatus according to claim 9, and means including a container holding a desiccant in the path of gas flow between said cover space and said surge chamber for removing moisture from said gas flow.

14. Apparatus for collecting solar heat comprising a substantially planar radiation receptor adapted to be supported at an inclination across the path of sunlight, said receptor comprising a thin front panel exposed to the solar radiation, a back panel and means interconnecting said panels peripherally and along laterally spaced longitudinal regions thereof so as to define between them a shallow fluid-tight chamber subdivided into a multiplicity of laterally sepatate long shallow channels for confining liquid filling them to a thin layer and extending from a common plenum space in the lower end of the chamber to a common plenum space in its upper end, an inlet to the lower plenum space for liquid flow thereto and an outlet from the upper plenum space for outflow of heated liquid, said channels each being of not more than about one-half inch in average depth and being sufficiently limited in width that liquid filling and being heated in said channels will not distort them and will flow upwardly in them by thermal-gravity effects to collect heat in said upper plenum space, and closure means for shielding said receptor from ambient atmospheric conditions, said closure means including a heat insulating support having a base underlying and an upright side wall extending peripherally about said receptor and a transparent cover sheet spaced from said front panel and forming over said receptor a substantially gas-tight cover space containing air or other radiation permeable gas, and means including a gas containing surge chamber communicating with said cover space for flowing gas into and from the same in response to variations of the pressure therein.

15. Apparatus according to claim 14, said cover sheet overlying and being sealed to said side wall.

16. Apparatus according to claim 14, said receptor being rigid and said closure means including a rigid peripheral side wall interconnecting said cover sheet and the periphery of said receptor.

17. Apparatus according to claim 14, said surge chamber being a moisture impervious expansible and self-contractible container, and means including a container holding a desiccant in the path of gas flow between said cover space and said surge chamber for removing moisture from said gas flow.

18. Apparatus for collecting solar heat comprising a substantially planar radiation receptor adapted to be supported at an inclination across the path of sunlight, said receptor comprising a thin front panel exposed to the solar radiation, a back panel and means interconnecting said panels peripherally and in and along laterally spaced longitudinal regions thereof so as to define between them a shallow fluid-tight chamber subdivided into a multiplicity of laterally separate long shallow channels confining liquid filling them to a thin layer and extending from a common plenum space in the lower end of said chamber to a common plenum space in its upper end, an inlet to said lower plenum space for liquid flow thereinto, an outlet from said upper plenum space for outflow of heated liquid, conduit means for conducting liquid completely filling said chamber and said conduit means in a circuit from said outlet to a heat exchange zone and thence back into said inlet, means including a surge chamber vented to the atmosphere and holding liquid in communication with but at an elevation a short distance higher than the liquid in said circuit for holding said liquid constantly under an elevated pressure insufficient to rupture said chamber; said channels each being of not more than about one-half inch in average depth and being sufficiently limited in width that liquid filling and being heated in said channels will not distort them and will flow upwardly in them by thermal-gravity effects to collect heat in said upper plenum space, said chamber and said circuit having a liquid containing capacity amounting to less than 2½ quarts per square foot of exposed front surface of said receptor; said heat exchange zone comprising a heat exchanger having therein passageway for conducting said liquid along one side of heat transfer walls adapted to be contacted over their other side by a fluid to be heated, a pump in said conduit means for flowing the liquid filling said circuit upwardly through said receptor chamber and thence back into said lower plenum space via said heat exchanger, means for sensing the temperature of liquid in said upper plenum space, and means activated by said sensing means for operating said pump when said temperature exceeds a predetermined level; a heat insulating support having a base underlying and an upright side wall extending peripherally about said receptor, closure means including a transparent cover sheet spaced from said front panel and forming over said receptor a substantially gas-tight cover space containing air or other radiation permeable gas, means including a gas containing surge chamber communicating with said cover space for flowing gas into and from the same in response to variations of the pressure therein, and means including a container holding a desiccant in the path of gas flow between said cover space and said surge chamber for removing moisture from said gas flow.

19. Apparatus according to claim 1, said receptor and said circuit having a liquid containing capacity amounting to less than 1¼ quarts per square foot of exposed front surface of said receptor.

* * * * *